(12) United States Patent
Osamoto et al.

(10) Patent No.: US 8,903,196 B2
(45) Date of Patent: Dec. 2, 2014

(54) VIDEO PRESENTATION AT FRACTIONAL SPEED FACTOR USING TIME DOMAIN INTERPOLATION

(75) Inventors: Akira Osamoto, Ibaraki (JP); Hiroki Yamaguchi, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 1851 days.

(21) Appl. No.: 11/244,265

(22) Filed: Oct. 5, 2005

(65) Prior Publication Data

US 2007/0076802 A1    Apr. 5, 2007

(51) Int. Cl.
| | |
|---|---|
| G06K 9/32 | (2006.01) |
| H04N 19/80 | (2014.01) |
| H04N 19/51 | (2014.01) |
| H04N 19/16 | (2014.01) |
| H04N 19/172 | (2014.01) |
| H04N 19/102 | (2014.01) |
| H04N 19/85 | (2014.01) |
| H04N 5/783 | (2006.01) |
| G11B 27/00 | (2006.01) |
| H04N 9/79 | (2006.01) |
| H04N 9/806 | (2006.01) |
| H04N 5/85 | (2006.01) |
| H04N 9/804 | (2006.01) |

(52) U.S. Cl.
CPC .............. *H04N 7/468* (2013.01); *H04N 9/7921* (2013.01); *H04N 7/26377* (2013.01); *H04N 9/8063* (2013.01); *H04N 7/26218* (2013.01); *H04N 7/26271* (2013.01); *H04N 7/26111* (2013.01); *H04N 5/85* (2013.01); *H04N 9/8042* (2013.01); *H04N 7/26882* (2013.01); *H04N 5/783* (2013.01); *G11B 27/005* (2013.01)
USPC ...................................... 382/300; 375/240.26

(58) Field of Classification Search
USPC ...................................... 382/300; 375/240.26
See application file for complete search history.

(56) References Cited

U.S. PATENT DOCUMENTS

| | | | | |
|---|---|---|---|---|
| 5,666,461 | A * | 9/1997 | Igarashi et al. .................. | 386/95 |
| 2003/0076884 | A1 * | 4/2003 | Lin et al. .................. | 375/240.15 |
| 2003/0112871 | A1 * | 6/2003 | Demos ..................... | 375/240.15 |

\* cited by examiner

*Primary Examiner* — John Strege
(74) *Attorney, Agent, or Firm* — Robert D. Marshall, Jr.; Frederick J. Telecky, Jr.

(57) ABSTRACT

This invention involves time domain interpolation of video signals. In order to adjust the presentation speed of a video data stream, a plurality of video frames is temporarily stored in a frame buffer, and the video frame to be displayed is generated by time domain interpolation between a plurality of the stored frames.

10 Claims, 6 Drawing Sheets

VIDEO PRESENTATION AT FRACTIONAL SPEED FACTOR USING TIME DOMAIN INTERPOLATION

TECHNICAL FIELD OF THE INVENTION

The technical field of this invention is digital video compression.

BACKGROUND OF THE INVENTION

Recent progress in digital technology has made the widespread use of compressed digital video signals practical. Standardization has been very important in the development of common compression methods to be used in the new services and products that are now possible. This allows the new services to interoperate with each other and encourages the investment needed in integrated circuits to make the technology affordable.

MPEG (Moving Picture Experts Group) was started in 1988 as a working group within ISO/IEC (International Standardization Organization/International Electrotechnical Commission) with the aim of defining standards for digital compression of audio-visual signals. MPEG's first project, MPEG-1, was published in 1993 as ISO/IEC 11172. It is a three-part standard defining audio and video compression coding methods and a multiplexing system for interleaving audio and video data so that they can be played back together. MPEG-1 principally supports video coding up to about 1.5 Mbit/s giving quality similar to VHS and stereo audio at 192 bit/s. It is used in the CD-i (CD-interactive) and Video-CD systems for storing video and audio on CD-ROM.

During 1990, MPEG recognized the need for a second, related standard for coding video for broadcast formats at higher data rates. The MPEG-2 standard is capable of coding standard-definition television at bit rates from about 3-15 Mbit/s and high-definition television at 15-30 Mbit/s. MPEG-2 extends the stereo audio capabilities of MPEG-1 to multi-channel surround sound coding. MPEG-2 decoders will also decode MPEG-1 bitstreams.

MPEG-2 aims to be a generic video coding system supporting a diverse range of applications. Different algorithmic tools, developed for many applications, have been integrated into the full standard. To implement all the features of the standard in all decoders is unnecessarily complex and a waste of bandwidth, so a small number of subsets of the full standard, known as profiles and levels, have been defined. A profile is a subset of algorithmic tools and a level identifies a set of constraints on parameter values (such as picture size and bit rate). A decoder which supports a particular profile and level is only required to support the corresponding subset of the full standard and set of parameter constraints.

Television services in the United States broadcast video at a frame rate of slightly less than 30 Hz. Each frame consists of two interlaced fields, giving a field rate of slightly less than 60 Hz. The first field of each frame contains only the odd numbered lines of the frame (numbering the top frame line as line 1), and the second field contains only the even numbered lines of the frame. It is important to note that one interlaced frame contains fields from two instants in time.

In video systems other than television, non-interlaced video is commonplace (for example, most computers output non-interlaced video). In non-interlaced video, all the lines of a frame are sampled at the same instant in time. Non-interlaced video is also termed progressively scanned or sequentially scanned video.

The red, green and blue (RGB) signals commonly used can be equivalently expressed as luminance (Y) and chrominance (UV) components. The chrominance bandwidth may be reduced relative to the luminance without significantly affecting the picture quality. For standard definition video, CCIR (Consultative Committee for International Radio) 601 defines how the component (YUV) video signals can be sampled and digitized to form discrete pixels. The terms 4:2:2 and 4:2:0 are often used to describe the sampling structure of the digital picture. 4:2:2 means the chrominance is horizontally subsampled by a factor of two relative to the luminance; 4:2:0 means the chrominance is horizontally and vertically subsampled by a factor of two relative to the luminance.

Using 8 bits for each Y, U or V pixel, the uncompressed bit rates are over 150 Mbits/second.

MPEG-2 is capable of compressing the bit rate of standard-definition 4:2:0 video down to about 3-15 Mbit/s. At the lower bit rates in this range, the artifacts introduced by the MPEG-2 coding and decoding process become increasingly objectionable.

In order to improve encoded quality, and additional pre-filtering step is usually implemented at the input to the encoder. The purpose of the pre-filter is to reduce or eliminate any high frequency noise that may be present in the input video source. If present, such noise would degrade the performance of the video encoder as the encoder would waste available bits in attempting to encode the noise itself.

In low bit rate applications, pre-filtering is also used to reduce the high frequency components of the source video to prevent blocking and ringing noise in the decoder. Blocking noise is the noise artifacts at the encoded block boundaries, while ringing and mosquito noise is usually due to excess high frequency components and is evident within the encoded blocks.

The pre-filter is usually implemented as a low pass filter. The amount of filtering is critical, as too much filtering will degrade the overall image quality.

SUMMARY OF THE INVENTION

Digital video playback systems require the capability of modifying the playback speed, either to fast forward or for slow play. In order to adjust the presentation speed of a video data stream, this invention stores a plurality of video frames in a frame buffer, and the video frame to be displayed is generated by time domain interpolation between a plurality of the stored frames.

BRIEF DESCRIPTION OF THE DRAWINGS

These and other aspects of this invention are illustrated in the drawings, in which.

DETAILED DESCRIPTION OF PREFERRED EMBODIMENTS

Video compression systems operate by removing redundant information from the signal at the coder prior to transmission and re-inserting it at the decoder. A coder and decoder pair are referred to as a codec. In video signals, two distinct kinds of redundancy can be identified.

Spatial and temporal redundancy: Pixel values are not independent, but are correlated with their neighbors both within the same frame and across frames. So, to some extent, the value of a pixel is predictable given the values of neighboring pixels.

Psycho visual redundancy: The human eye has a limited response to fine spatial detail, and is less sensitive to detail near object edges or around scene changes. Consequently, some artifacts introduced into the decoded picture by the bit rate reduction process may not be visible to the human eye.

Two of the main approaches employed in MPEG codecs are intra-frame Discrete Cosine Transform (DCT) coding and motion-compensated inter-frame prediction.

Figure 1:
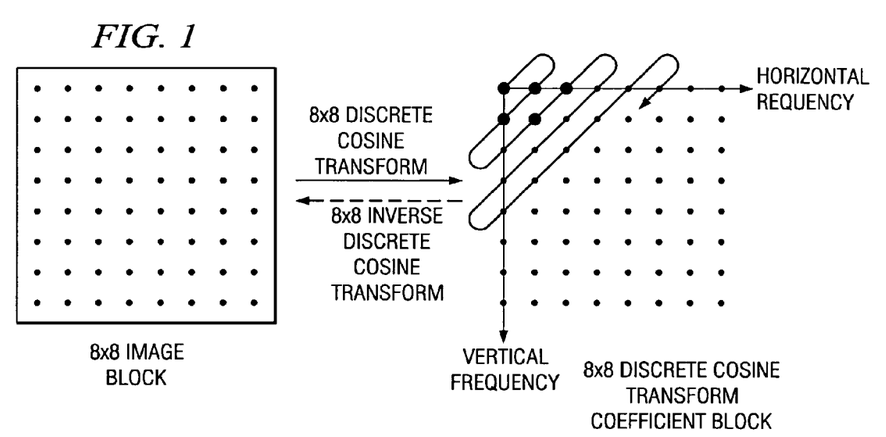
FIG. 1 shows the DCT/IDCT scanning in MPEG.

In Intra-frame DCT coding a two-dimensional DCT is performed on small blocks (8×8 pixels) of each component of the picture to produce blocks of DCT coefficients as shown in FIG. 1. The magnitude of each DCT coefficient indicates the contribution of a particular combination of horizontal and vertical spatial frequencies to the original picture block. The coefficient corresponding to zero horizontal and vertical frequency is called the DC coefficient. In the right side of FIG. 1, the pixel value and DCT coefficient magnitude are represented by dot size.

The DCT doesn't directly reduce the number of bits required to represent the block. In fact for an 8×8 block of 8 bit pixels, the DCT produces an 8×8 block of 11 bit coefficients (the range of coefficient values is larger than the range of pixel values.) The reduction in the number of bits follows from the observation that, for typical blocks from natural images, the distribution of coefficients is non-uniform. The transform tends to concentrate the energy into the low-frequency coefficients and many of the other coefficients are near-zero. The bit rate reduction is achieved by not transmitting the near-zero coefficients and by quantizing and coding the remaining coefficients as described below. The non-uniform coefficient distribution is a result of the spatial redundancy present in the original image block.

Quantization: The function of the coder is to transmit the DCT block to the decoder, in a bit rate efficient manner, so that it can perform the inverse transform to reconstruct the image. It has been observed that the numerical precision of the DCT coefficients may be reduced while still maintaining good image quality at the decoder. Quantization is used to reduce the number of possible values to be transmitted, reducing the required number of bits.

The degree of quantization applied to each coefficient is weighted according to the visibility of the resulting quantization noise to a human observer. In practice, this results in the high-frequency coefficients being more coarsely quantized than the low-frequency coefficients. Note that the quantization noise introduced by the coder is not reversible in the decoder, making the coding and decoding process lossy.

Coding: The serialization and coding of the quantized DCT coefficients exploits the likely clustering of energy into the low-frequency coefficients and the frequent occurrence of zero-value high-frequency coefficients. The block is scanned in a diagonal zigzag pattern starting at the DC coefficient to produce a list of quantized coefficient values, ordered according to the scan pattern from low-frequency components to high-frequency components.

The list of values produced by scanning is entropy coded using a variable-length code (VLC). Each VLC code word denotes a run of zeros followed by a non-zero coefficient of a particular level. VLC coding recognizes that short runs of zeros are more likely than long ones and small coefficients are more likely than large ones. The VLC allocates code words which have different lengths depending upon the probability with which they are expected to occur. To enable the decoder to distinguish where one code ends and the next begins, the VLC has the property that no complete code is a prefix of any other.

FIG. 1 shows the zigzag scanning process, using the scan pattern common to both MPEG-1 and MPEG-2. MPEG-2 has an additional alternate scan pattern intended for scanning the quantized coefficients resulting from interlaced source pictures.

Motion-compensated inter-frame prediction exploits temporal redundancy by attempting to predict the frame to be coded from a previous reference frame. The prediction cannot be based on a source picture because the prediction has to be repeatable in the decoder, where the source pictures are not available (the decoded pictures are not identical to the source pictures because the bit rate reduction process introduces small distortions into the decoded picture.) Consequently, the coder contains a local decoder which reconstructs pictures exactly as they would be in the decoder, from which predictions can be formed.

The simplest inter-frame prediction of the block being coded is that which takes the co-sited (i.e. the same spatial position) block from the reference picture. Naturally this makes a good prediction for stationary regions of the image, but is poor in moving areas. A more sophisticated method, known as motion-compensated inter-frame prediction, is to offset any motion which has occurred between the block being coded and the corresponding block in the reference frame and to use a shifted block from the reference frame as the prediction.

One method of determining the motion that has occurred between the block being coded and the reference frame is a block-matching search in which a large number of trial offsets are tested by the coder using the luminance component of the picture. The best offset is selected on the basis of minimum error between the block being coded and the prediction.

The bit rate overhead of using motion-compensated prediction is the need to convey the motion vectors required to predict each block to the decoder. For example, using MPEG-2 to compress standard-definition video to 6 Mbit/s, the motion vector overhead could account for about 2 Mbit/s during a picture making heavy use of motion-compensated prediction.

Figure 2A:
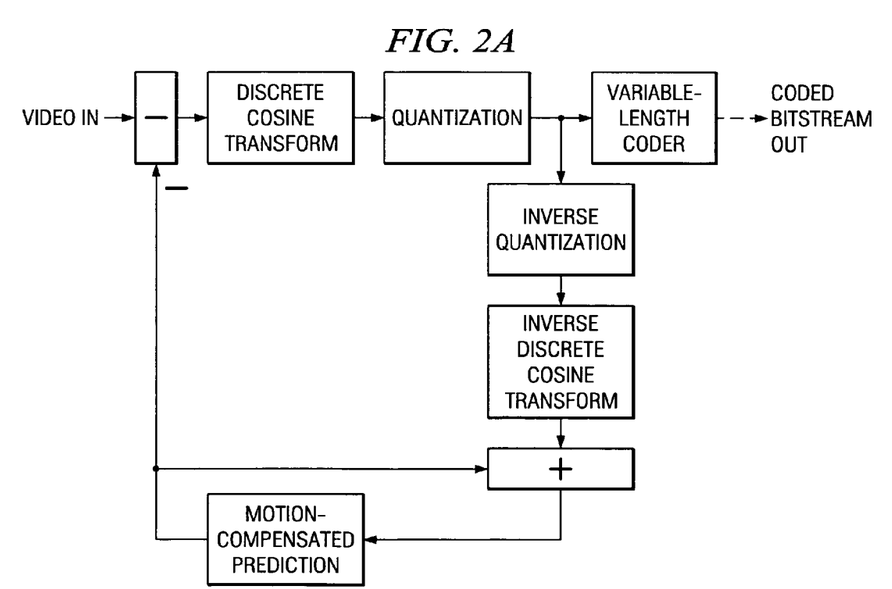
FIG. 2A is a block diagram of a typical MPEG coder and FIG. 2B is a block diagram of a typical MPEG decoder.
Figure 2B:
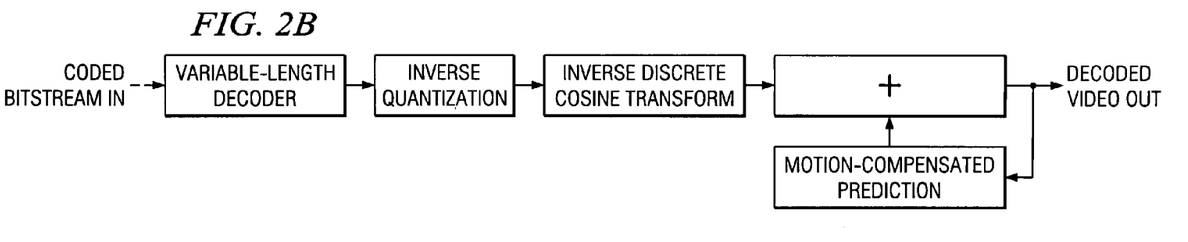
Figure 3:
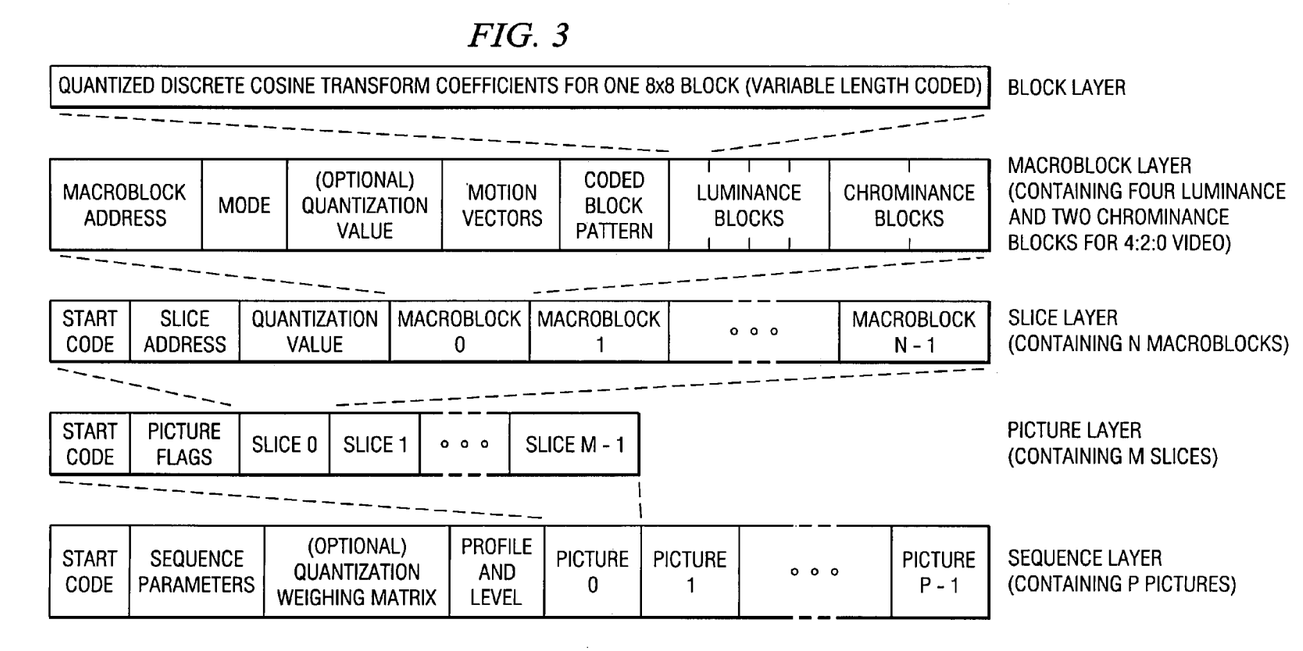
FIG. 3 shows the MPEG-2 bit stream structure.

In an MPEG-2 system, the DCT and motion-compensated interframe prediction may be combined, as shown in FIG. 2. The coder subtracts the motion-compensated prediction from the source picture to form a prediction error picture. The prediction error is transformed with the DCT, the coefficients are quantized and these quantized values coded using a VLC. The coded luminance and chrominance prediction error is combined with side information required by the decoder, such as motion vectors and synchronizing information, and formed into a bit stream for transmission. FIG. 3 shows an outline of the MPEG-2 video bit stream structure.

In the decoder, the quantized DCT coefficients are reconstructed and inverse transformed to produce the prediction error. This is added to the motion-compensated prediction generated from previously decoded pictures to produce the decoded output.

In an MPEG-2 codec, the motion-compensated predictor shown in FIG. 2 supports many methods for generating a prediction. For example, the block may be forward predicted from a previous picture, backward predicted from a future picture, or bidirectionally predicted by averaging a forward and backward prediction. The method used to predict the block may change from one block to the next. Additionally, the two fields within a block may be predicted separately with their own motion vector, or together using a common motion vector. Another option is to make a zero-value prediction, such that the source image block rather than the prediction error block is DCT coded. For each block to be coded, the coder chooses between these prediction modes, trying to maximize the decoded picture quality within the constraints of the bit rate. The choice of prediction mode is transmitted to the decoder, with the prediction error, so that it may regenerate the correct prediction.

In MPEG-2, three picture types are defined. The picture type defines which prediction modes may be used to code each block.

Intra pictures (I-pictures) are coded without reference to other pictures. Moderate compression is achieved by reducing spatial redundancy, but not temporal redundancy. They can be used periodically to provide access points in the bit stream where decoding can begin.

Predictive pictures (P-pictures) can use the previous I- or P-picture for motion compensation and may be used as a reference for further prediction. Each block in a P-picture can either be predicted or intra-coded. By reducing spatial and temporal redundancy, P-pictures offer increased compression compared to I-pictures.

Bidirectionally-predictive pictures (B-pictures) can use the previous and next I or P pictures for motion-compensation, and offer the highest degree of compression. Each block in a B-picture can be forward, backward or bidirectionally predicted or intra-coded. To enable backward prediction from a future frame, the coder reorders the pictures from natural display order to bit stream order so that the B-picture is transmitted after the previous and next pictures it references. This introduces a reordering delay dependent on the number of consecutive B-pictures.

The different picture types typically occur in a repeating sequence, termed a Group of Pictures or GOP. A typical GOP in display order is:

$B_1 B_2 I_3 B_4 B_5 P_6 B_7 B_8 P_9 B_{10} B_{11} P_{12}$

The corresponding bit stream order is:

$I_3 B_1 B_2 P_6 B_4 B_5 P_9 B_7 B_8 P_{12} B_{10} B_{11}$

A regular GOP structure can be described with two parameters: N, which is the number of pictures in the GOP, and M, which is the spacing of P-pictures. The GOP given here is described as N=12 and M=3. MPEG-2 does not insist on a regular GOP structure. For example, a P picture following a scene change may be badly predicted since the reference picture for prediction is completely different from the picture being predicted. Thus, it may be beneficial to code it as an I picture instead.

For a given decoded picture quality, coding using each picture type produces a different number of bits. In a typical example sequence, a coded I picture was three times larger than a coded P picture, which was itself 50% larger than a coded B picture.

By removing much of the redundancy from the source images, the coder outputs a variable bit rate. The bit rate depends on the complexity and predictability of the source picture and the effectiveness of the motion-compensated prediction.

For many applications, the bit stream must be carried as a fixed bit rate stream. In these cases, a buffer must be placed between the coder and the output. The buffer is filled at a variable rate by the coder, and emptied at a constant rate by the transmitted stream. To prevent the buffer from under or overflowing, a feedback mechanism must be implemented to adjust the average coded bit rate as a function of the buffer size and fullness. For example, the average coded bit rate may be lowered by increasing the degree of quantization applied to the DCT coefficients. This reduces the number of bits generated by the variable-length coding, but increases distortion in the decoded image. The decoder must also have a buffer between the transmission channel and the variable rate input to the decoding process. The size of the buffers in the coder and decoder must be the same.

MPEG-2 defines the maximum decoder (and hence coder) buffer size, although the coder may choose to use only part of this. The delay through the coder and decoder buffer is equal to the buffer size divided by the transmission channel bit rate. For example, an MPEG-2 coder operating at 6 Mbit/s with a buffer size of 1.8 Mbits would have a total delay through the coder and decoder buffers of around 300 ms. Reducing the buffer size will reduce the delay, but may affect picture quality if the buffer becomes too small to accommodate the variation in bit rate from the coder VLC.

Most MPEG implementations contain a pre-filter to improve video quality by reducing artifacts caused by noise in the input signal. The amount of filtering is critical, as excessive filtering will degrade the resultant image. Most implementations of the pre-filter depend on a feedback mechanism to minimize such degradation.

Figure 4:
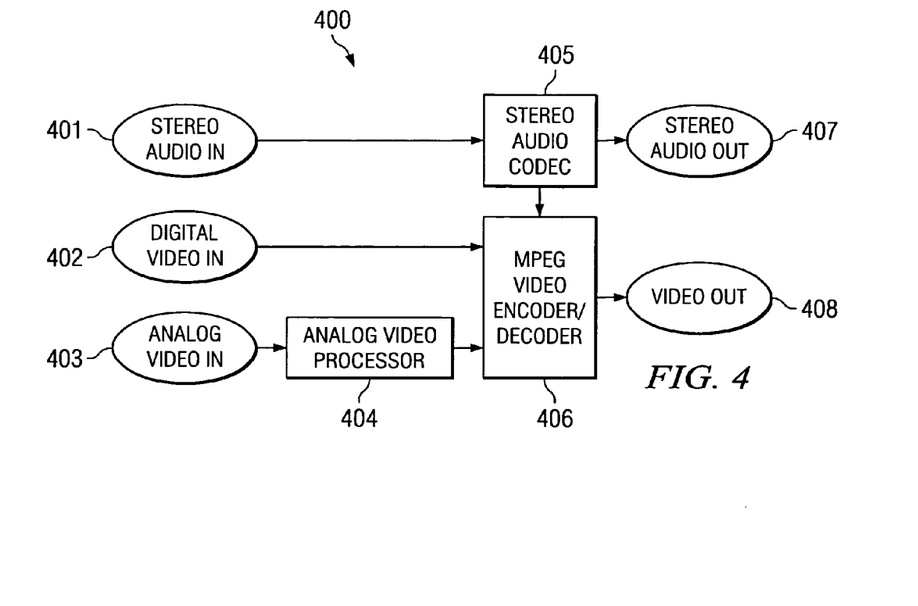
FIG. 4 is a block diagram of a digital video system to which this invention is applicable.

FIG. 4 is a block diagram of a system to which this invention is applicable. The preferred embodiment is a DVD recorder or a DVD player/recorder where the pre-filter of this invention is employed to improve the recorded video quality.

System 400 receives digital video data through input block 402. The digital video data may originate from a satellite receiver, digital cable interface, digital video camera or other sources. Alternately, analog video data from a VCR, analog video camera, analog cable interface or other sources may be supplied to input block 403. In this case, the analog video is digitized in analog video processor block 404. In either case, the resultant digital video signal is further processed by MPEG video encoder/decoder block 406. This processing may optionally comprise of decryption of the data stream, authorization of conditional access to the date, decompression of the MPEG compressed data stream, audio/video synchronization by interaction with stereo audio decoder block 405, color space conversion to/from YUV, RGB, component and composite video streams, and other functions. The resulting video streams are output through block 408 for display, storage or further processing.

Optionally separate mono or stereo audio signals may be supplied to stereo audio codec 405 through stereo audio input 401. The resultant processed audio as well as the audio processed by MPEG video encoder/decoder 406 may be output through block 407.

Most of digital video players have the capability of playing a video sequence at a speed other than normal speed (1×). This function is called fast forward when the speed is faster than normal or slow motion when the speed is slower than 1×. Conventional methods allow integral speed factors such as 2× or ¼×. This can be achieved by simply skipping some video frames (fast forward) or displaying each frame multiple times (slow motion).

More flexible playback requires the presentation of a video sequence at a fractional speed factor such as ⅞× or ⁹⁄₈×. However, several undesirable effects appear when the methods known in the prior art are applied to fractional speed factors. Subjective experiments have shown that time-domain interpolation can greatly outperform the conventional methods known in the prior art. This invention describes how high-quality video playback at fractional speed factors can be accomplished by using time-domain interpolation.

Figure 5:
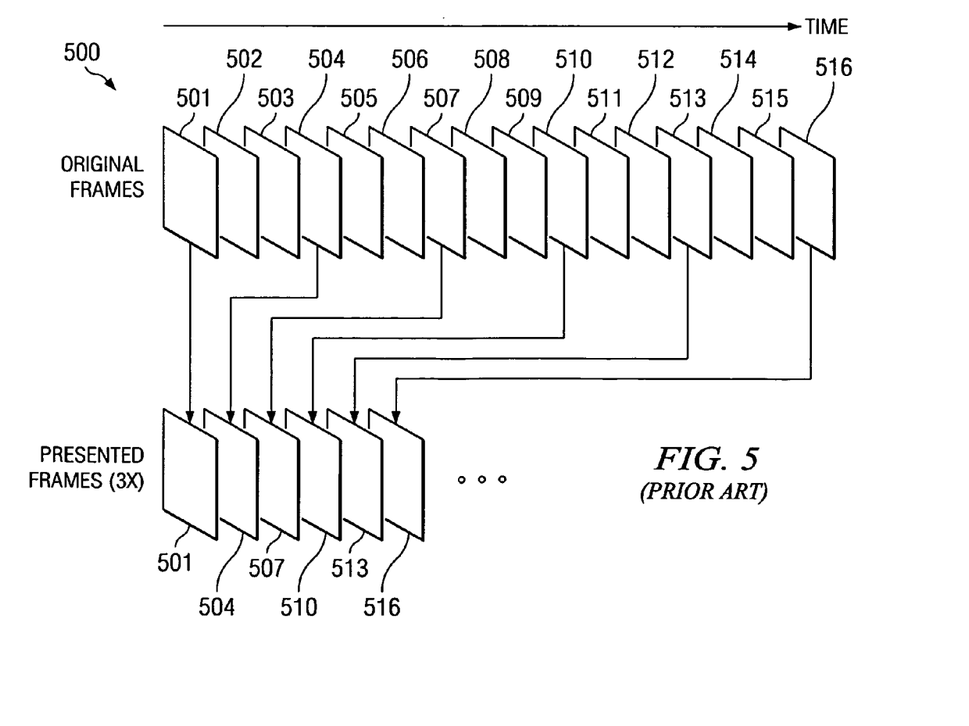
FIG. 5 shows fast forward playback as known in the prior art.
Figure 6:
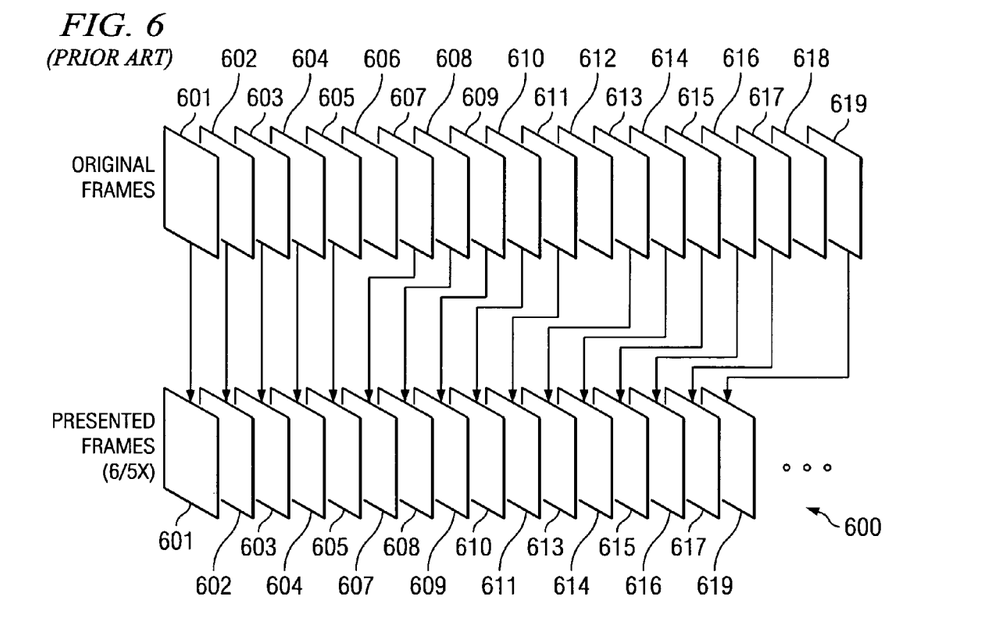
FIG. 6 shows the non-uniform fast forward playback resulting from methods known in the prior art.

FIG. 5 shows one method known in the prior art to display video in fast forward mode. Frame 501 is displayed, frames 502 and 503 are skipped, and then frame 504 is displayed. This sequence is repeated resulting in a 3× fast forward display. FIG. 6 demonstrates the same method with a fractional speed up—in this case at 6/5×. Frames 601-605 are displayed and 606 is skipped. The sequence then repeats with displaying frames 607-611, and skipping frame 612. Then frames 613-617 are displayed before skipping 618. Skipping every sixth frame results in a non-uniform display, significantly degrading the visual quality.

Figure 7:
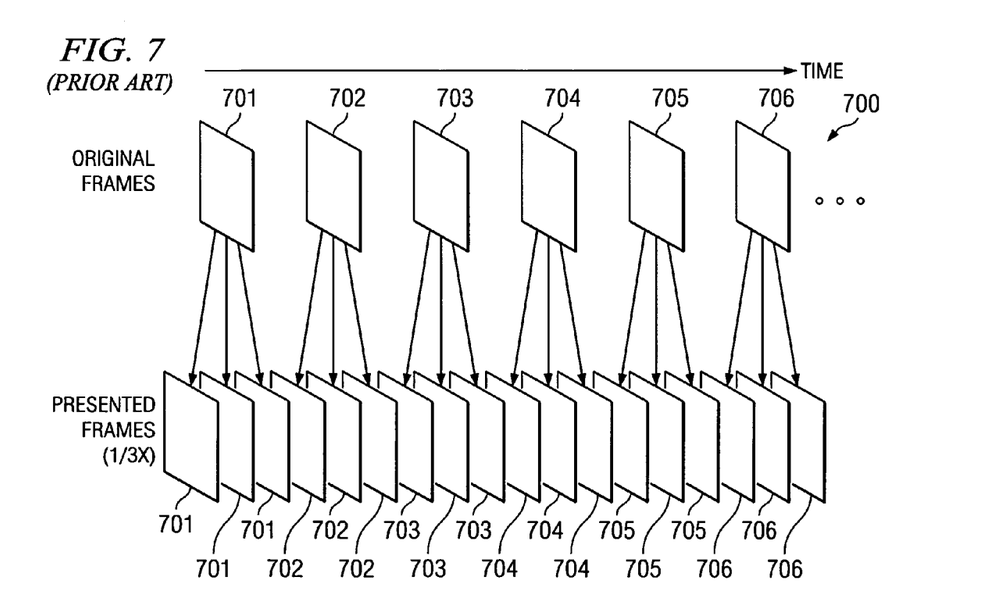
FIG. 7 shows slow forward playback as known in the prior art.

FIG. 7 illustrates slow motion implemented by a method known in the prior art. Frames 701 ... 706 are each displayed 3 times, resulting in a ⅓× slow motion display.

Figure 8:
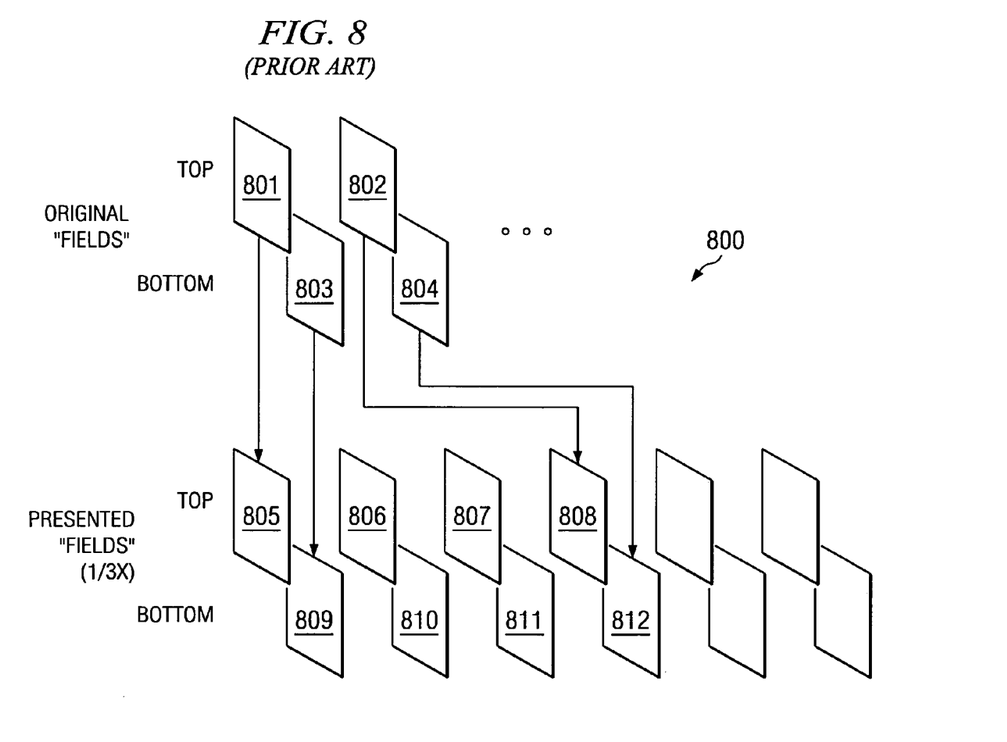
FIG. 8 shows time irregularities during slow forward playback resulting from methods known in the prior art.

This implementation of slow motion suffers from the same non-uniformity as the previously shown fast forward mode when it is applied to fractional speed factors. In addition, there is an additional problem when the video source is in interlaced video format. If both fields are used and displayed multiple times, time inversion will occur. FIG. 8 demonstrates this. Each interlaced frame consists of two fields that represent video scenes at two different points of time. In the figure, the first frame comprised of fields 801 and 803 corresponds to time $t_0$ and $t_1$. If we repeat both fields, we will see a $t_0 \rightarrow t_1 \rightarrow t_0 \rightarrow t_1 \rightarrow t_0 \ldots$ sequence. The $t_1 \rightarrow t_0$ transition is backwards in time and will result in a severe degradation of the picture quality. The most common way to avoid this problem is to use only one field. By discarding one field, time inversion is avoided at the expense of losing half of the vertical resolution, resulting in a lower resolution picture.

Figure 9:
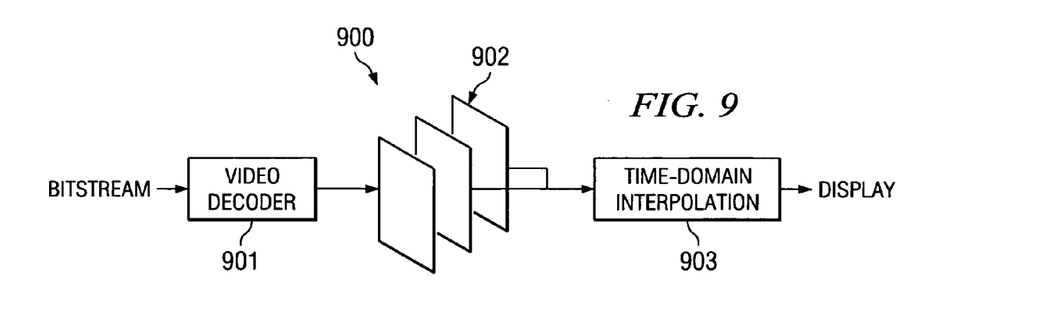
FIG. 9 is a block diagram of one implementation of the hardware employed in this invention.

FIG. 9 shows a block diagram of one embodiment of this invention. Video decoder 901 may be implemented in dedicated hardware, or in a programmable processor such as a DSP (Digital Signal Processor) made by Texas Instruments, Inc. In order to meet the performance requirements of this invention, the video decoder must be capable of decoding the video stream at twice the normal video speed. Block 902 is a frame buffer usually implemented in random access memory and has the capability of storing 3 frames of the video being processed. Block 903 performs the time domain interpolation function by performing alpha blending of the video frames or fields on a pixel by pixel basis.

Figure 10:
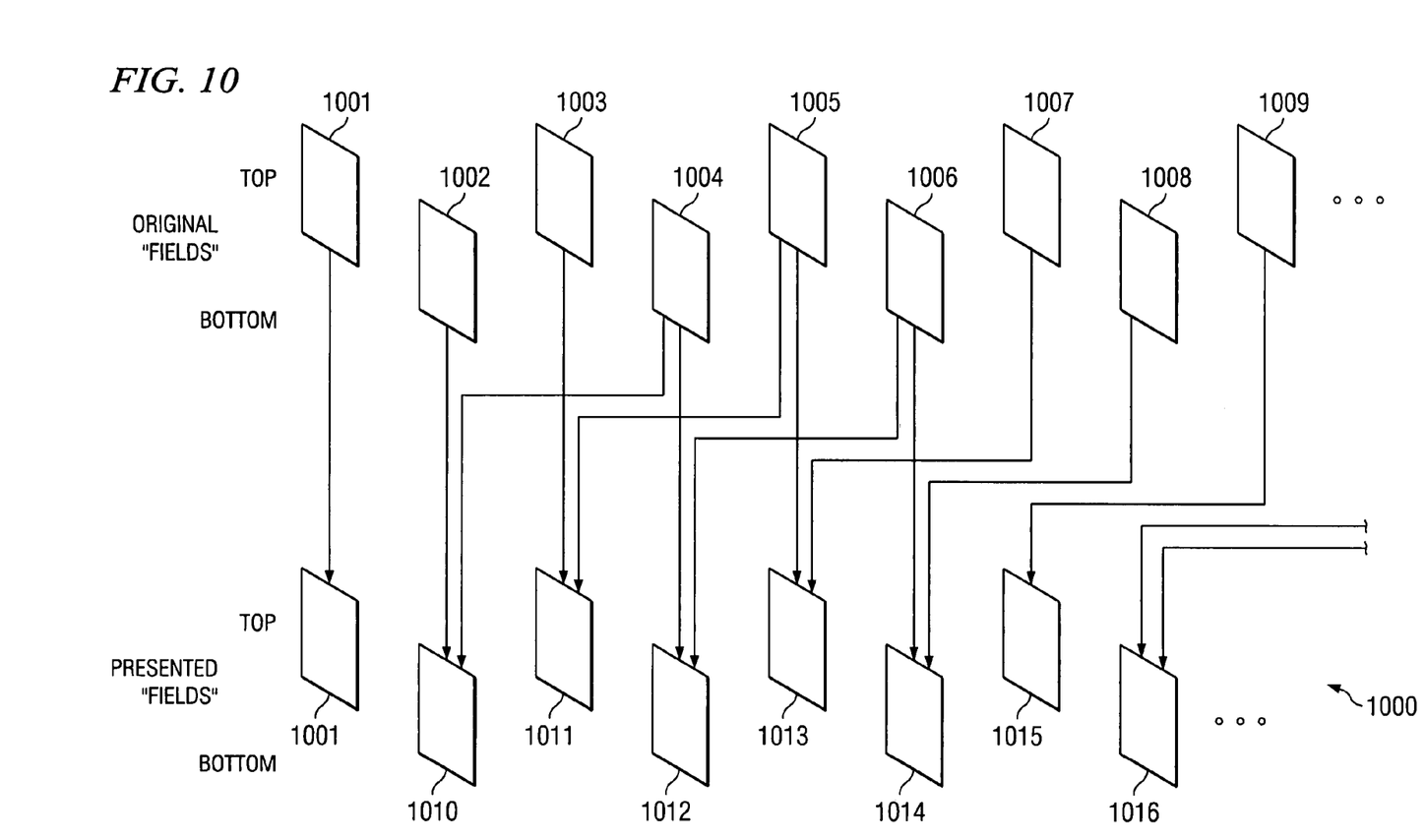
FIG. 10 shows the time domain interpolation as employed in this invention.

FIG. 10 shows an example of time domain interpolation as employed in this invention, applied to interlaced video. Each video field to be displayed is generated by combining two video fields to approximate the true video scene at the point of sampling time. Assume that the speed factor to implement is α, and the $n^{th}$ video frame is represented as I(n;x,y). The $i^{th}$ video frame to be displayed is generated by the following computation:

$$I'(i; x, y) = (1 - r_i)I(n_i; x, y) + r_i I(n_i + 1; x, y)$$
$$n_i = \lfloor f(i) \rfloor$$
$$r_i = f(i) - \lfloor f(i) \rfloor$$

$$f(i) \equiv \begin{cases} \alpha i & \text{(top field)} \\ \alpha\left(i + \frac{1}{2}\right) & \text{(bottom field} \wedge \text{progressive)} \\ \alpha\left(i + \frac{1}{2}\right) - \frac{1}{2} & \text{(bottom field} \wedge \text{interlace)} \end{cases}$$

where $\lfloor \bullet \rfloor$ denotes a rounding operation towards zero.

The above equations show the simple alpha blending of two source frames on a pixel by pixel basis with a blending factor that is proportional to the temporal distance between the original sampling point and the desired fractional sampling point. As shown in FIG. 10, field 1001 is displayed at the start of the sequence, then field 1002 is blended with field 1004 to generate display field 1010, field 1003 is blended with field 1005 to generate display field 1011, and the sequence is continued in this manner.

What is claimed is:

1. A computer-implemented method of modifying the display speed of a digital video signal to a new speed which is a fractional speed factor related to an original speed neither an integral multiple of the original speed nor an integral division of the original speed comprising the steps of:
   decoding all frames of said digital video signal;
   temporarily storing the frames of the decoded video signal in a frame buffer capable of storing at least three frames of the decoded video signal;
   displaying an initial frame of said digital video signal;
   for each further frame at the modified display speed
      computing a fractional sampling point for a next frame to be displayed within said digital video signal dependent upon a relation between said fractional speed factor and said original speed,
      computing contents of said next frame to be displayed using interpolation between a plurality of frames of the digital video signal at said original speed on a pixel by pixel basis with a weighing factor that is proportional to the temporal distance between the frames of the digital video signal at said original speed and the computed fractional sampling point, and
      displaying said contents of said next frame.

2. The computer-implemented method of claim 1, wherein:
the digital video signal is in the interlaced format where each frame is represented as two fields with each field having half of the vertical resolution of the frame, and the time domain interpolation is performed between a plurality of such fields.

3. The computer-implemented method of claim 1, wherein:
the digital video signal is in the progressive format, wherein each frame represents a complete picture, and the time domain interpolation is performed between a plurality of such frames.

4. A digital video apparatus for modifying a display speed of a digital video signal to a new speed which is a fractional speed factor related to an original speed neither an integral multiple of the original speed nor an integral division of the original speed comprising:
   a source of a digital video signal having an original speed;
   a digital signal processor connected to said source of a digital video signal programmed to:
      decode all frames of the digital video signal, store at least three frames of the decoded video signal in a temporary frame buffer, output for display an initial frame of said digital video signal, for each further frame at the modified display speed compute a fractional sampling point for a next frame to displayed within said digital video signal dependent upon a relation between said fractional speed factor and said original speed, computing contents of said next frame to be displayed using interpolation between a plurality of frames of the digital video signal at said original speed on a pixel by pixel basis with a weighing factor that is proportional to the temporal distance between the frames of the digital video signal at said original speed and the computed fractional sampling point, output for display said computed contents of said next frame to be displayed; and an output device connected to the digital signal processor for outputting the processed digital video signal.

5. The digital video apparatus of claim 4, wherein:

the digital video signal is in the interlaced format where each frame is represented as two fields with each field having half of the vertical resolution of the frame, and the time domain interpolation is performed between a plurality of such fields.

6. The digital video apparatus of claim 4, wherein:

the digital video signal is in the progressive format, where each frame represents a complete picture, and the time domain interpolation is performed between a plurality of such frames.

7. The method of claim 1, wherein:

said step of computing a frame to be displayed by applying time domain interpolation calculates $$I'(i;x,y) = (1 - r_i)I(n_i;x,y) + r_i I(n_i + 1;x,y)$$

$$n_i = \lfloor f(i) \rfloor$$

$$r_i = f(i) - \lfloor f(i) \rfloor$$

$$f(i) \equiv \alpha\left(i + \frac{1}{2}\right)$$

where: I'(i,x,y) is the pixel value of a pixel at location (x,y) of the index variable i interpolation frame; $I(n_i,x,y)$ is the pixel value of a pixel at location (x,y) of the $n_i^{th}$ frame; α is the fractional speed factor; and $\lfloor \bullet \rfloor$ denotes a rounding operation towards zero.

8. The method of claim 2, wherein:

said step of computing a frame to be displayed by applying time domain interpolation calculates $$I'(i;x,y) = (1 - r_i)I(n_i;x,y) + r_i I(n_i + 1;x,y)$$

$$n_i = \lfloor f(i) \rfloor$$

$$r_i = f(i) - \lfloor f(i) \rfloor$$

$$f(i) \equiv \begin{cases} \alpha i & \text{(top field)} \\ \alpha\left(i + \frac{1}{2}\right) - \frac{1}{2} & \text{(bottom field)} \end{cases}$$

where: I'(i,x,y) is the pixel value of a pixel at location (x,y) of the index variable i interpolation frame; $I(n_i,x,y)$ is the pixel value of a pixel at location (x,y) of the $n_i^{th}$ frame; α is the fractional speed factor; and $\lfloor \bullet \rfloor$ denotes a rounding operation towards zero.

9. The digital video apparatus of claim 4, wherein:

said digital signal processor is programmed to apply said time domain interpolation as follows $$I'(i;x,y) = (1 - r_i)I(n_i;x,y) + r_i I(n_i + 1;x,y)$$

$$n_i = \lfloor f(i) \rfloor$$

$$r_i = f(i) - \lfloor f(i) \rfloor$$

$$f(i) \equiv \alpha\left(i + \frac{1}{2}\right)$$

where: I'(i,x,y) is the pixel value of a pixel at location (x,y) of the index variable i interpolation frame; $I(n_i,x,y)$ is the pixel value of a pixel at location (x,y) of the $n_i^{th}$ frame; α is the fractional speed factor; and $\lfloor \bullet \rfloor$ denotes a rounding operation towards zero.

10. The digital video processor of claim 5, wherein:

said digital signal processor is programmed to apply said time domain interpolation as follows $$I'(i;x,y) = (1 - r_i)I(n_i;x,y) + r_i I(n_i + 1;x,y)$$

$$n_i = \lfloor f(i) \rfloor$$

$$r_i = f(i) - \lfloor f(i) \rfloor$$

$$f(i) \equiv \begin{cases} \alpha i & \text{(top field)} \\ \alpha\left(i + \frac{1}{2}\right) - \frac{1}{2} & \text{(bottom field)} \end{cases}$$

where: I'(i,x,y) is the pixel value of a pixel at location (x,y) of the index variable i interpolation frame; $I(n_i,x,y)$ is the pixel value of a pixel at location (x,y) of the $n_i^{th}$ frame; α is the fractional speed factor; and $\lfloor \bullet \rfloor$ denotes a rounding operation towards zero.

* * * * *